| United States Patent [19] | [11] Patent Number: 5,070,136 |
|---|---|
| Dersch et al. | [45] Date of Patent: Dec. 3, 1991 |

[54] AQUEOUS POLYMER DISPERSIONS FOR COATING WOOD

[75] Inventors: Rolf Dersch, Frankenthal; Heinrich Dehne, Ludwigshafen; Roland Gellert, Neustadt; Dietrich-Wolfgang Mueller, Dossenheim; Johannes Vinke, Hockenheim; Eckehardt Wistuba, Bad Duerkheim, all of Fed. Rep. of Germany

[73] Assignee: BASF Akteingesellschaft, Ludwigshafen, Fed. Rep. of Germany

[21] Appl. No.: 678,881

[22] Filed: Mar. 26, 1991

Related U.S. Application Data

[63] Continuation of Ser. No. 141,100, Jan. 5, 1988, abandoned.

[30] Foreign Application Priority Data

Jan. 10, 1987 [DE] Fed. Rep. of Germany ....... 3700534

[51] Int. Cl.$^5$ .............................................. C08L 39/00
[52] U.S. Cl. .................................... 524/555; 524/543; 524/818
[58] Field of Search .................... 524/555, 543, 818

[56] References Cited

U.S. PATENT DOCUMENTS

| 3,389,110 | 6/1968 | Taft et al. ............................ 524/460 |
|---|---|---|
| 4,070,319 | 1/1978 | Carel et al. .......................... 524/831 |
| 4,107,120 | 8/1978 | Plamondon et al. ................. 524/831 |
| 4,128,520 | 12/1978 | Barabas et al. ....................... 524/831 |
| 4,234,467 | 11/1980 | Ryrfors et al. ....................... 524/831 |
| 4,366,282 | 12/1982 | Zima et al. ............................ 524/317 |
| 4,395,525 | 7/1983 | Fischer et al. ..................... 526/307.6 |
| 4,397,984 | 8/1983 | Wendel et al. ....................... 524/831 |
| 4,455,342 | 6/1984 | Fink et al. ............................. 524/831 |
| 4,745,134 | 5/1988 | Osei-Gyimah ....................... 521/28 |

FOREIGN PATENT DOCUMENTS 0170400 5/1986 European Pat. Off. .
1530517 11/1978 United Kingdom .

*Primary Examiner*—Joseph L. Schofer
*Assistant Examiner*—J. M. Reddick
*Attorney, Agent, or Firm*—Keil & Weinkauf

[57] ABSTRACT

Aqueous polymer dispersions essentially containing a copolymer of
  a) from 85 to 98.5% by weight of methacrylates,
  b) from 0.5 to 4% by weight of arcylic acid and/or methacrylic acid,
  c) from 0.5 to 4% by weight of acrylamide and/or methacrylamide,
  d) from 0.5 to 4% by weight of an $\alpha,\beta$-ethylenically diunsaturated or polyunsaturated compound and
  e) from 0 to 3% by weight of a carbonyl-containing $\alpha,\beta$-ethylenically unsaturated compound, a process for their preparation, and their use for coating wood.

4 Claims, No Drawings

AQUEOUS POLYMER DISPERSIONS FOR COATING WOOD

This application is a continuation of application Ser. No. 141,100, filed on Jan. 5, 1988, now abandoned.

The present invention relates to aqueous polymer dispersions essentially containing a copolymer of
a) from 85 to 98.5% by weight of methacrylates,
b) from 0.5 to 4% by weight of acrylic acid and/or methacrylic acid,
c) from 0.5 to 4% by weight of acrylamide and/or methacrylamide,
d) from 0.5 to 4% by weight of an $\alpha,\beta$-ethylenically diunsaturated or polyunsaturated compound and
e) from 0 to 3% by weight of a carbonyl-containing $\alpha,\beta$-ethylenically unsaturated compound,
and a process for its preparation and its use for coating wood.

Wood surfaces, such as those of paneling, furniture and doors, are frequently coated with transparent finishes for protection and for aesthetic reasons. To date, nitro finishes, acid-curable alkyd-amino finishes, finishes based on unsaturated polyesters, and polyurethane finishes have been used. The stated traditional finishes are unacceptable for reasons relating to occupational hygiene and environmental protection, because of the solvents which are present therein and which pass into the atmosphere during processing and drying.

German Laid-Open Application DOS 2,535,660 describes a process for the preparation of crosslinkable polymers and copolymers containing methylolated carboxamide groups. European Patent 29,144 discloses the use of N-methylol(meth)acrylamide-containing aqueous polymer dispersions for coating wood surfaces. The methylol groups may react with one another at above 100° C., i.e. the finish may undergo crosslinking and hence an improvement in its resistance to chemical influences. However, the disadvantage is that the temperature required for the reaction of the methylol groups is frequently too high when the substrate is wood, and that formaldehyde is eliminated in this crosslinking reaction.

Furthermore, these coatings give surfaces which do not fully meet practical requirements with regard to scratch resistance, hardness, flexibility, sandability, stackability and resistance to chemical influences, for example drinks and cleaners.

It is an object of the present invention to provide polymer dispersions for the preparation of aqueous wood finishes which do not have the abovementioned disadvantages.

We have found that this object is achieved by aqueous polymer dispersions essentially containing a copolymer of
a) from 85 to 98.5% by weight of methacrylates,
b) from 0.5 to 4% by weight of acrylic acid and/or methacrylic acid,
c) from 0.5 to 4% by weight of acrylamide and/or methacrylamide,
d) from 0.5 to 4% by weight of an $\alpha,\beta$-ethylenically or polyunsaturated compound and
e) from 0 to 3% by weight of a carbonyl-containing $\alpha,\beta$-ethylenically unsaturated compound.

Particularly suitable components a) are methacrylates of $C_1$–$C_{12}$-monoalcohols, preferably $C_1$–$C_8$-monoalcohols, such as methanol, ethanol, n-propanol, isopropanol, n-butanol, isobutanol, tert-butanol, cyclohexanol, 2-ethylhexanol and lauryl alcohol. n-Butyl methacrylate or a mixture of n-butyl methacrylate with up to 25% by weight of methyl methacrylate is particularly preferred. The methacrylates are used in amounts of from 85 to 98.5, preferably from 90 to 97, % by weight.

Components c) and d) are each used in amounts of from 0.5 to 4, preferably from 0.5 to 2.5, % by weight.

$\alpha,\beta$-ethylenically diunsaturated or polyunsaturated compounds are used as component d), in amounts of from 0.5 to 4%, preferably from 0.5 to 2.5, % by weight. Examples of suitable compounds are divinylaromatics, such as divinylbenzene, diacrylates and dimethacrylates of $C_2$–$C_{24}$-diols, such as butanediol diacrylate, butanediol dimethacrylate and hexanediol diacrylate. divinylureas, such as divinylethyleneurea, and di- and triallyl compounds, such as diallyl phthalate and triallyl isocyanurate. Divinylbenzene, butanediol diacrylate and butanediol dimethacrylate are preferably used.

Carbonyl-containing $\alpha,\beta$-ethylenically unsaturated compounds e) may also be present. Where they are used, from 1 to 3% by weight are preferred. Examples of suitable compounds are acrolein, methacrolein, diacetoneacrylamide, diacetonemethacrylamide, 2-butanonemethacrylates and vinyl acetoacetate.

From 0.5 to 1 mole of a dihydrazide of an aliphatic dicarboxylic acid, preferably of a $C_4$–$C_{16}$-dicarboxylic acid, can be added to the dispersion per mole of carbonyl-containing monomer, as an additional crosslinking agent where compounds (e) are present. Examples of suitable dihydrazides are adipodihydrazide, glutarodihydrazide and succinodihydrazide.

The novel polymer dispersions can be prepared by conventional emulsion polymerization processes using initiators, such as hydrogen peroxide, sodium persulfate, potassium persulfate, organic peroxides or conventional redox initiator systems, regulators, such as mercaptans, emulsifiers/protective colloids, such as Na salts of $C_{12}$–$C_{18}$-paraffinsulfonic acids or salts of acidic sulfuric half esters of ethylene oxide (propylene oxide) adducts, and other conventional assistants, so that further information is not necessary.

The novel dispersions usually have solids contents of from 20 to 60, preferably from 40 to 50, % by weight and LT (light transmission) values of from 70 to 98%, preferably from 90 to 96%.

Wood finishes prepared from the novel polymer dispersions may contain conventional additives, such as waxes based on paraffin and polyethylene. The waxes are usually added as 20–60% strength by weight dispersions during or after the emulsion polymerization. The waxes used have softening points of about 50°–250° C., preferably 70°–130° C. The size of the wax particles may be from 0.01 to 0.5 μm.

To improve film formation, film forming assistants, such as butylglycol, mixtures of diisobutyl esters of adipic, glutaric and/or succinic acid and other solvents may be added in amounts of from 3 to 8% by weight.

Flatting agents, such as silica compounds, in amounts of from 0.5 to 2% by weight, and thickeners based on polyurethane and/or polyacrylates may also be present.

The wood finishes prepared using the novel dispersions can be processed by brushing, spraying and curtain coating.

Drying is carried out at room temperature but may also be effected at elevated temperatures of up to 80° C. in conventional tunnel dryers.

The coatings thus obtained are readily sandable and have good stacking properties and high resistance to chemical influences.

EXAMPLES

Preparation of the polymer dispersions

The initially taken mixtures stated in each of Examples 1 to 4 were heated to 85° C., while stirring, in a reaction vessel equipped with four feed vessels. 5% by weight of each of the feeds 1 and 2 were added, and initial polymerization was carried out for 15 minutes. The remaining amount of feed 1 was then added in the course of 2.5 hours, and the remaining amount of feed 2 introduced in the course of 2.75 hours. When feed 1 was complete, polymerization was continued for a further 1.75 hours, after which the mixture was cooled to 20° C. The pH was brought to 8 with 25% strength by weight aqueous ammonia solution. In Examples 1 and 2, the particular feed 3 stated there was then added dropwise in the course of 5 minutes, and stirring was continued for 55 minutes. The feeds 4 described in Examples 1 to 4 were finally each introduced in the course of 15 minutes, while stirring. The characteristic properties of the polymer dispersions are shown in the relevant Examples.

EXAMPLE 1

| | |
|---|---|
| Initially taken mixture | 550 g of water |
| | 33.7 g of 28% strength by weight Na salt of $C_{12}$-$C_{14}$-fatty alcohol ether sulfate |
| | (ethylene oxide content: 2.5% by weight) |
| Feed 1 | 510 g of water |
| | 33.7 g of 28% strength by weight Na salt of $C_{12}$-$C_{14}$-fatty alcohol ether sulfate |
| | (ethylene oxide content: 2.5% by weight) |
| | 14.2 g of acrylic acid |
| | 14.2 g of methacrylic acid |
| | 14.2 g of 1,4-butandiol diacrylate |
| | 18.9 g of 50% strength by weight acrylamide in water |
| | 18.9 g of diacetoneacrylamide |
| | 802.4 g of n-butyl methacrylate |
| | 141.6 g of methyl methacrylate |
| Feed 2 | 170 g of water |
| | 4.7 g of sodium peroxydisulfate |
| Feed 3 | 13.9 g of adipodihydrazide |
| Feed 4 | 90 g of 35% strength by weight polyethylene wax emulsion (dropping point of the solid 130° C.) |
| Characteristic properties | |
| Solids content (% by weight) | 43.8 |
| Viscosity, DIN 4 cup at 23° C. (s) | 32 |
| LT value (%) | 96 |
| (0.01% strength by weight solution of the dispersion) | |

EXAMPLE 2

| | |
|---|---|
| Initially taken mixture | 550 g of water |
| | 29 g of 15% strength by weight sodium laurylsulfate |
| | 24.2 g of 20% strength by weight oxyethylated $C_8$-alkylphenol |
| | (ethylene oxide content: 2.5% by weight) |
| Feed 1 | 370 g of water |
| | 67.7 g of 15% strength by weight sodium laurylsulfate |
| | 14.6 g of acrylic acid |
| | 14.2 g of methacrylic acid |
| | 10.9 g of divinylbenzene |
| | 19.4 g of 50% strength by weight acrylamide in water |
| | 19.4 g of diacetoneacrylamide |
| | 967 g of n-butylmethacrylate |
| Feed 2 | 170 g of water |
| | 4.3 g of sodium persulfate |
| Feed 3 | 13.9 g of adipodihydrazide |
| Feed 4 | 90 g of 35% strength by weight polyethylene wax emulsion (dropping point of the solid 130° C.) |
| Characteristic properties | |
| Solids content (% by weight) | 46.6 |
| Viscosity, DIN 4 cup at 23° C. (s) | 38 |
| LT value (%) | 94 |
| (0.01% strength by weight solution of the dispersion) | |

EXAMPLE 3

| | |
|---|---|
| Initially taken mixture | 550 g of water |
| | 33.7 g of 28% strength by weight Na salt of $C_{12}$-$C_{14}$-fatty alcohol ether sulfate |
| | (ethylene oxide content: 2.5% by weight) |
| Feed 1 | 340 g of water |
| | 33.7 g of 28% strength by weight Na salt of $C_{12}$-$C_{14}$-fatty alcohol ether sulfate |
| | (ethylene oxide content: 2.5% by weight) |
| | 7.1 g of acrylic acid |
| | 14.2 g of methacrylic acid |
| | 18.9 g of 1,4-butanediol diacrylate |
| | 243 g of methylmethacrylate |
| | 708 g of n-butylmethacrylate |
| Feed 2 | 160 g of water |
| | 4.7 g of sodium persulfate |
| Feed 3 | — |
| Feed 4 | 90 g of 35% strength by weight polyethylene wax emulsion (dropping point of the solid 130° C.) |
| Characteristic properties | |
| Solids content (% by weight) | 46.7 |
| Viscosity, DIN 4 cup at 23° C. (s) | 28 |
| LT value (%) | 95 |
| (0.01% strength by weight solution of the dispersion) | |

EXAMPLE 4

| | |
|---|---|
| Initially taken mixture | 550 g of water |
| | 33.7 g of 28% strength by weight Na salt of $C_{12}$-$C_{14}$-fatty alcohol ether sulfate |
| | (ethylene oxide content: 2.5% by weight) |
| Feed 1 | 340 g of water |
| | 33.7 g of 28% strength by weight Na salt of $C_{12}$-$C_{14}$-fatty alcohol ether sulfate |
| | (ethylene oxide content: 2.5% by weight) |
| | 14.2 g of acrylic acid |
| | 14.2 g of methacrylic acid |
| | 18.9 g of 50% strength by weight acrylamide in water |
| | 188.8 g of methyl methacrylate |
| | 755.2 g of n-butyl methacrylate |
| Feed 2 | 160 g of water |
| | 4.7 g of sodium persulfate |
| Feed 3 | — |
| Feed 4 | 90 g of 35% strength by weight polyethylene wax emulsion (dropping point of the solid 130° C.) |
| Characteristic properties | |
| Solids content (% by weight) | 45.0 |
| Viscosity, DIN 4 cup at 23° C. (s) | 25 |
| LT value (%) | 91 |
| (0.01% strength by weight solution of the dispersion) | |

EXAMPLE 5

Preparation of a wood finish 20 g of xylene,
10 g of 3,3,5-trimethylpentane-1,3-diol isobutyrate,
3 g of the Na salt of a sulfated oleic acid dibutylamide (about 40% strength by weight in water),
4 g of an antifoam based on mineral oil,
21 g of water,
25 g of a 55% strength by weight polyurethane thickener in butyldiglycol/water (reaction product of an oxyethylated tallow fatty alcohol with hexamethylene diisocyanate),
15 g of a flatting agent based on silica,
34 g of ethylene glycol mono-n-butyl ether,
40 g of diethylene glycol monoethyl ether,
806 g of polymer dispersion according to Example 1, 2, 3 or 4,
2 g of a $C_{16}$-$C_{19}$-oxoalcohol containing 35 propylene oxide and 5 ethylene oxide units,
20 g of 50% strength by weight Ca stearate dispersion in water and
20 g of a 35% strength by weight polyethylene wax emulsion (dropping point of the solid 130° C.)

were mixed at room temperature, with stirring, to give a wood finish.

Table 1 summarizes the test results for the wood surfaces (light oak) coated with this wood finish. The wood finish was applied by spraying on two coats (about 80 g/m² of finish in each case) and sanding between the coats, and was dried at room temperature.

TABLE 1

| Test results for the coated wood surface | | | | |
|---|---|---|---|---|
| | 1 | 2 | 3 | 4 (Comparison) |
| 1. Sandability | good | very good | good | good |
| 2. Scratch resistance | very good | very good | very good | good |
| 3. Cold check[2] +50° C. and −20° C. alternately for 1 hour each | 100 | 100 | 100 | 100 |
| 4. Steam resistance[3] | very good | very good | good | poor |
| 5. Resistance to chemical influences according to DIN 68.860 | good to very good | good to very good | good | adequate |

(Specific results are shown in Table 2)

[2] Wood specimens (20 × 5.5 × 0.8 cm) were coated once with the wood finish (μm wet, application by means of a frame) and were dried at 70° C. for 20 minutes, sanded (grade 240) and coated again as described above. The coated wood was stored for 1 week at 23° C. and 50% relative humidity and then stored for 1 hour at +50° C. in a drying oven and for 1 hour at −20° C. in a chest freezer. A cycle comprises in each case storage at +50° C. and −20°C. After each cycle, the coating was examined for damage (cracking). The cold check indicates the number of cycles and is a measure of the flexibility of the coating.

[3] The coating was exposed to steam at 100° C. for 5 minutes. Softening and blushing were checked (immediately and after redrying for 24 hours).

TABLE 2

| Resistance of chemical influences (specific results) | | | | | |
|---|---|---|---|---|---|
| Test agent according to DIN 68.860 | Duration of action | Example[a] | | | |
| | | 1 | 2 | 3 | 4 (Comparison) |
| 1 acetic acid | 60 min | 0 | 0 | 0 | 0 |
| 2 citric acid | 60 min | 0 | 0 | 0 | 0 |
| 3 sodium carbonate | 2 min | 0 | 0 | 0 | 2 |
| 4 ammonia water | 2 min | 0 | 0 | 0 | 2 |
| 5 ethyl alcohol | 60 min | 0 | 0 | 2 | 4 |
| 6 white wine, red wine fortified wine | 5 h | 0 | 0 | 1 | 2 |
| 7 beer | 5 h | 0 | 0 | 0 | 0 |
| 8 cola drinks | 16 h | 0 | 0 | 0 | 0 |
| 9 instant coffee | 16 h | 2 | 2 | 2 | 3 |
| 10 black tea | 16 h | 0 | 0 | 1 | 2 |
| 11 blackcurrant juice | 16 h | 1 | 1 | 1 | 3 |
| 12 condensed milk | 16 h | 0 | 0 | 2 | 4 |
| 12 water | 16 h | 0 | 0 | 0 | 1 |
| 14 gasoline | 2 min | 0 | 0 | 0 | 0 |
| 15 acetone | 10 s | 0 | 0 | 3 | 4 |
| 16 ethylbutyl acetate | 10 s | 0 | 0 | 2 | 2 |
| 17 butter | 16 h | 1 | 1 | 0 | 1 |
| 18 olive oil | 16 h | 1 | 0 | 0 | 1 |
| 19 mustard | 5 h | 1 | 1 | 1 | 1 |
| 20 salt | 5 h | 0 | 0 | 0 | 0 |
| 21 onions | 5 h | 0 | 0 | 0 | 0 |
| 22 lipstick | 16 h | 4 | 4 | 3 | 4 |
| 23 disinfectant | 10 min | 0 | 0 | 1 | 2 |
| 24 cleaner[b] | 60 min | 1 | 1 | 2 | 4 |
| 25 cleaning solution[c] | 60 min | 0 | 0 | 0 | 0 |

[a] Rating according to DIN 53,230
  0: no change
  5: very great change
[b] Mixture of 70% by weight of Na dodecylbenzenesulfonate and 30% by weight of alkylaryl polyglycol ether
[c] 33% strength by weight solution of b) in water

We claim:

1. An aqueous copolymer dispersion in which the copolymer consists of:
   a) from 85 to 98.5% by weight of methacrylates of $C_1$-$C_{12}$-monalcohols,
   b) from 0.5 to 4% by weight of acrylic acid, methacrylic acid or mixtures thereof,
   c) from 0.5 to 4% by weight of acrylamide, methacrylamide or mixtures thereof,
   from 0.5 to 4% by weight of a diacrylate or a dimethacrylate of $C_2$-$C_{24}$-diols, a divinyl aromatic compound, a divinyl urea, a diallyl or triallyl compound or mixtures thereof, and
   e) from 0 to 3% by weight of acrolein, methacrolein, diacetoneacrylamide, diacetonemethacrylamide, 2-butanonemethacrylates, vinyl acetoacetate or mixtures thereof.

2. The aqueous copolymer dispersion of claim 1, containing conventional additives.

3. The aqueous copolymer dispersion of claim 2 wherein said additives are selected from waxes, film formation assistants, solvents, flattening agents, thickeners or mixtures thereof.

4. An aqueous polymer dispersion as defined in claim 1, wherein the copolymer consists of
   a) from 85 to 98.5% by weight of a mixture of N-butyl methacrylate and methyl methacrylate,
   b) from 0.5 to 4% by weight of a mixture of acrylic acid and methacrylic acid,
   c) from 0.5 to 4% by weight of acrylamide, and
   d) from 0.5 to 4% by weight of 1,4-butanediol diacrylate.

* * * * *

UNITED STATES PATENT AND TRADEMARK OFFICE
CERTIFICATE OF CORRECTION

PATENT NO. : 5,070,136

DATED : December 3, 1991

INVENTOR(S) : Rolf DERSCH et al.

It is certified that error appears in the above-identified patent and that said Letters Patent is hereby corrected as shown below:

Title Page:

In the Abstract, Line 4

"Arcylic" should read --acrylic--.

Signed and Sealed this

Thirteenth Day of April, 1993

Attest:

STEPHEN G. KUNIN

*Attesting Officer*          *Acting Commissioner of Patents and Trademarks*